US012767544B2

(12) United States Patent
Maree et al.

(10) Patent No.: US 12,767,544 B2
(45) Date of Patent: Oct. 20, 2026

(54) PROCESS FOR EXTRACTING VALUES FROM LITHIUM SLAG

(71) Applicant: Tianqi Lithium Kwinana Pty Ltd, Kwinana Beach (AU)

(72) Inventors: Suzanne Elizabeth Maree, Kardinya (AU); Mirela Ghisi, Meadow Springs (AU); Hazel Lim, Meadow Springs (AU); Yafeng Guo, Stirling (AU)

(73) Assignee: Tianqi Lithium Kwinana Pty Ltd, Kwinana Beach (AU)

(*) Notice: Subject to any disclaimer, the term of this patent is extended or adjusted under 35 U.S.C. 154(b) by 1010 days.

(21) Appl. No.: 16/966,649

(22) PCT Filed: Dec. 11, 2018

(86) PCT No.: PCT/AU2018/051321
§ 371 (c)(1),
(2) Date: Jul. 31, 2020

(87) PCT Pub. No.: WO2019/148233
PCT Pub. Date: Aug. 8, 2019

(65) Prior Publication Data

US 2021/0032724 A1 Feb. 4, 2021

(30) Foreign Application Priority Data

Feb. 2, 2018 (AU) ................................ 2018900329
Mar. 28, 2018 (AU) ................................ 2018901028
Aug. 23, 2018 (AU) ................................ 2018903103

(51) Int. Cl.
*C01B 33/18* (2006.01)
*B09B 3/00* (2022.01)
(Continued)

(52) U.S. Cl.
CPC ................ *C01B 33/18* (2013.01); *B09B 3/00* (2013.01); *B09B 3/40* (2022.01); *B09B 3/70* (2022.01);
(Continued)

(58) Field of Classification Search
CPC C22B 7/00; C22B 7/006; C22B 7/007; C22B 7/008; C22B 7/02; C22B 7/04;
(Continued)

(56) References Cited

U.S. PATENT DOCUMENTS 1,843,006 A 1/1932 Hillman
2,516,109 A * 7/1950 Ellestad ................. C22B 26/12
423/179.5
(Continued)

FOREIGN PATENT DOCUMENTS

CN 101125656 2/2008
CN 102649996 8/2012
(Continued)

OTHER PUBLICATIONS

Ge Kuang, Huan Li, Song Hu, Ran Jin, Shanjun Liu, Hui Guo. A green route to sustainable alkali-activated materials by heat and chemical activation of lithium slag, Sep. 2, 2015, Hydrometallurgy, vol. 157, pp. 214-218, (Year: 2015).*
(Continued)

*Primary Examiner* — Keith D. Hendricks
*Assistant Examiner* — Nikolas Takuya Pullen
(74) *Attorney, Agent, or Firm* — Suzannah K. Sundby, Esq.; Canady + Lortz LLP

(57) ABSTRACT

A process for extracting values from lithium slag comprising: (a) hydrothermally treating lithium slag with an aqueous solution of an alkaline compound at selected temperature and duration; (b) performing an ion exchange step on the alkaline treated lithium slag; and (c) recovering values
(Continued)

selected from the group consisting of aluminium compounds, silicon compounds and compounds containing silicon and aluminium.

21 Claims, 1 Drawing Sheet

(51) Int. Cl.

| | |
|---|---|
| ***B09B 3/40*** | (2022.01) |
| ***B09B 3/70*** | (2022.01) |
| ***C01B 33/20*** | (2006.01) |
| ***C01F 7/306*** | (2022.01) |
| ***C01F 7/56*** | (2022.01) |
| ***C22B 3/10*** | (2006.01) |
| ***C22B 3/12*** | (2006.01) |
| ***C22B 3/24*** | (2006.01) |
| ***C22B 3/42*** | (2006.01) |
| ***C22B 3/44*** | (2006.01) |
| ***C22B 7/00*** | (2006.01) |
| ***C22B 7/04*** | (2006.01) |
| ***C22B 21/00*** | (2006.01) |

(52) U.S. Cl.
CPC .............. *C01B 33/20* (2013.01); *C01F 7/306* (2013.01); *C01F 7/56* (2013.01); *C22B 3/10* (2013.01); *C22B 3/12* (2013.01); *C22B 3/24* (2013.01); *C22B 3/42* (2013.01); *C22B 3/44* (2013.01); *C22B 7/007* (2013.01); *C22B 7/008* (2013.01); *C22B 7/04* (2013.01); *C22B 21/0007* (2013.01); *C22B 21/0023* (2013.01); *Y02P 10/20* (2015.11)

(58) Field of Classification Search
CPC ............ C22B 21/0007; C22B 21/0015; C22B 21/0023; C22B 3/00; C22B 3/04; C22B 3/12; C22B 3/06; C22B 3/10; C22B 3/20; C22B 3/22; C22B 3/24; C22B 3/42; C22B 3/44; C22B 3/46; Y02P 10/20; C01B 33/26
See application file for complete search history.

(56) References Cited

U.S. PATENT DOCUMENTS

| | | | | |
|---|---|---|---|---|
| 3,112,170 | A | 11/1963 | Archambault | |
| 3,131,022 | A | 4/1964 | Archambault | |
| 4,158,042 | A | 6/1979 | Deutschman | |
| 4,486,402 | A * | 12/1984 | Gurtner | C01F 7/306 423/626 |
| 6,132,773 | A * | 10/2000 | Amiche | C09C 1/024 424/490 |
| 6,309,615 | B1 * | 10/2001 | Hollitt | C01F 7/0613 423/625 |
| 9,028,789 | B2 * | 5/2015 | Brito da Silva Correia | C01D 15/08 423/429 |
| 9,517,944 | B2 | 12/2016 | Senyuta | |
| 2017/0022068 | A1 | 1/2017 | Rodriguez | |

FOREIGN PATENT DOCUMENTS

| | | |
|---|---|---|
| CN | 103183366 | 7/2013 |
| CN | 103601230 | 2/2014 |
| CN | 103964482 | 8/2014 |
| CN | 104152686 | 11/2014 |
| CN | 105130223 | 12/2015 |
| CN | 106687611 | 5/2017 |
| CN | 107089674 | 8/2017 |
| CN | 107267777 | 10/2017 |
| CN | 107815557 | 3/2018 |
| EP | 0250342 | 12/1987 |
| GB | 1082250 | 9/1967 |
| WO | 2017121663 | 7/2017 |
| WO | 2019148233 | 8/2019 |

OTHER PUBLICATIONS

Suprapto, Suprapto & Istiqomah, Zahrotul & Santoso, Eko & Prasetyoko, Didik. Alumina Extraction from Red Mud by Magnetic Separation. 2017. Indonesian Journal of Chemistry. 18. 331-336 (Year: 2017).*

Ge, et al., "Extraction of lithium from—spodumene using sodium sulfate solution", May 2018, pp. 49-56, vol. 177, Publisher: Hydrometallurgy (Abstract).

Gonzalo-Delgado et al., "Recycling of hazardous waste from tertiary aluminium industry in a value-added material", Feb. 1, 2011, pp. 127-134, vol. 29, No. 2, Publisher: Waste Manag Res.

Li et al., "Abstract", "Experimental Study on Leaching Silicon and Aluminum from Fly Ash in Alkaline Solution at Low Temperature", 2017, pp. 36-38, vol. 46, Publisher: Shandong Chemical Industry (English Abstract).

Lopez Delgado, et al., "Synthesis of alpha-alumina from a less common raw material", 2012, pp. 1-14, vol. 64, Publisher: Journal of Sol-Gel Science and Technology.

Padilla, et al., "Effects of Different Raw Materials in the Synthesis of Boehmite and gamma- and alpha-Alumina", Oct. 19, 2016, pp. 1-6, vol. 2016, Publisher: Journal of Chemistry.

* cited by examiner

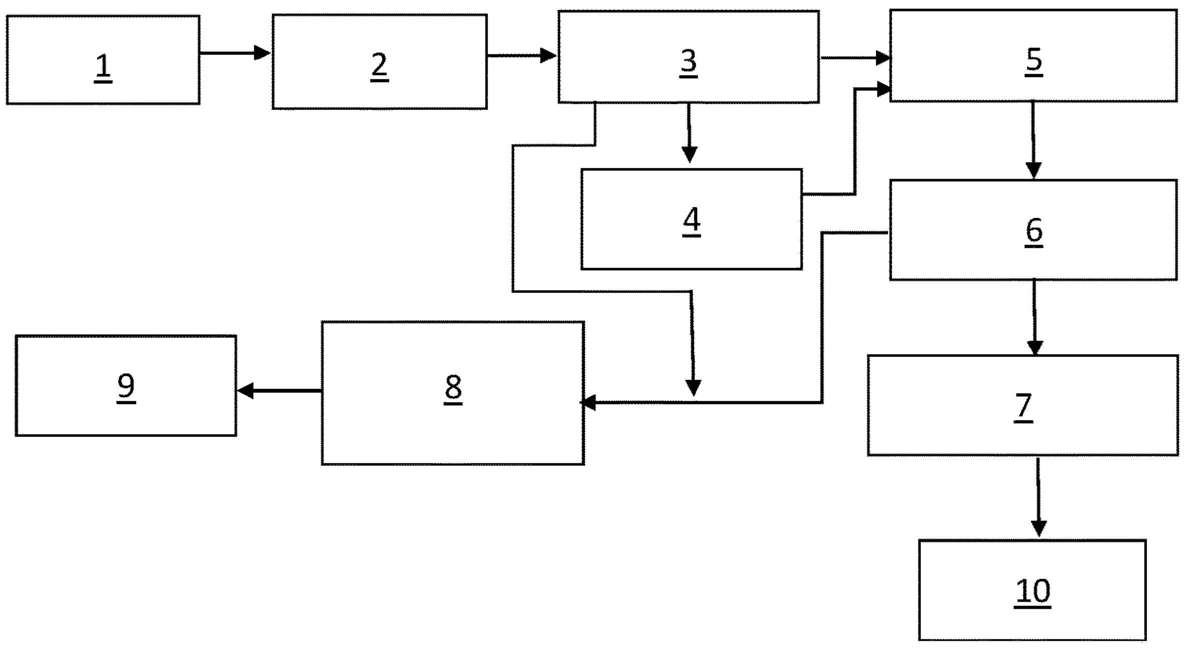
1
2
3
5
4
6
9
8
7
10

PROCESS FOR EXTRACTING VALUES FROM LITHIUM SLAG

FIELD OF THE INVENTION

This invention relates to a process for extracting values, for example high purity alumina and silica, from lithium slag. Lithium slag is the waste product from refining lithium bearing aluminosilicate minerals, including but not limited to, spodumene, lepidolite, petalite, pegmatites or other lithium bearing aluminosilicates.

BACKGROUND TO THE INVENTION

Processes to produce alumina and compounds derived from alumina from aluminosilicates include, for example, treatment of kaolin where the first step is an energy expensive calcining step prior to an acid leach. This is in addition to the mining and attrition cost. In another process where aluminium hydroxide is produced through the Bayer process, temperatures of 150 to 200° C. are used creating significant heating costs in addition to mining and attrition costs. A well known environmental dilemma of the Bayer process is the production of vast quantities of caustic "red mud".

In contrast, lithium slag, as described above, is currently a low value by-product of the hard rock lithium refining industry being only suitable for use as a low value additive in the cement and construction industry. The lithium slag is a by-product that can be used as delivered from the refinery with the mining, attrition and calcining cost already accounted for in the lithium refining process.

However, lithium slag as a source of alumina and silica is yet to be successfully exploited. Conventional acid leach techniques and, indeed other techniques, appear to have been unsuccessful. U.S. Pat. Nos. 3,007,770 and 3,112,170 describes the alkaline treatment of beta-spodumene for the purpose of extracting lithium. The formed zeolitic material is considered a by-product. In U.S. Pat. No. 3,112,170 an ion exchange is performed with ammonium carbonate for the purpose of extracting lithium and not as a source of alumina.

It is an object of the present invention to provide a process for extracting values, such as alumina and silica desirably of high purity, from lithium slag.

SUMMARY OF THE INVENTION

With this object in view, the present invention provides a process for extracting values from lithium slag comprising:

(a) hydrothermally treating lithium slag with an aqueous solution of an alkaline compound at selected temperature and duration;

(b) performing an ion exchange step on the alkaline treated lithium slag; and (c) recovering values selected from the group consisting of aluminium compounds, silicon compounds and compounds containing silicon and aluminium.

Desirably, the aqueous solution of alkaline compound (AC) is strongly alkaline, desirably being a strongly alkaline compound of sodium or potassium including caustic soda, potassium hydroxide, sodium carbonate and potassium carbonate. The lithium slag to AC weight by weight ratio is preferably in the range about 1:0.1 to about 1:2 to optimise conversion of lithium slag to value compounds.

The nature of the aluminium and silicon (aluminosilicate) compounds obtained from the alkaline hydrothermal treatment is temperature as well as alkaline concentration dependent. The alkaline treated lithium slag contains a compound or compounds, desirably exhibiting ion exchange properties (for example zeolites A, X or P), that are expected to be obtained in acceptable yield at temperature of about 90° C. or higher and a solids density above 10%, preferably above 20% and optionally up to about 50%. Lower temperatures, as low as 60° C., may also be sufficient, though hydrothermal treatment or residence time will likely be longer. The process may render itself to a desired aluminium extraction level, for example 85% extraction or higher, though the required extraction is dictated by process economics, so a lower extraction level may be acceptable.

The hydrothermal treatment typically solubilises small amounts of alumina and a greater proportion of silica. The silica solubilises to silicate compounds of nature dependent on the alkaline compound used in the above described hydrothermal treatment. If caustic soda is used, sodium silicate will be solubilised. If potassium hydroxide is used, potassium silicate will be solubilised. Dissolved silicates may be precipitated in a precipitation step using a suitable precipitant such as lime. Again, precipitation step temperature and precipitation step duration are selected to optimise the precipitation step. However, heating may not be necessary and the step may be conducted at temperatures including room temperature. Desirably, the precipitation step allows regeneration of the alkaline compound selected for the hydrothermal step and the selected alkaline compound can be recycled to the hydrothermal treatment step.

A solid/liquid separation step would typically follow the hydrothermal treatment with alkaline compound, whether conducted single or multi-stage. A multi-stage process may be used for producing zeolite P. Such a multi-stage process may involve two stages in which the first stage (which may be called an aging stage) is conducted at a first temperature and the second hydrothermal treatment stage is conducted at a second temperature higher than the first temperature. Residence time in the second stage may also be longer than residence time in the first stage. This may improve product zeolite quality. However, single stage hydrothermal treatment without the first aging step, conveniently at a temperature equal to or higher than the second temperature is also possible with similar results in terms of product quality. In either case, separated solid residue may then advantageously be subjected to an acid leaching step, desirably using hydrochloric acid to form aluminium chloride hexahydrate.

The process includes an ion exchange step after the alkaline treatment, to remove the introduced sodium or potassium or any cation already in the mineral matrix that may influence the quality of target value or high value target products such as high purity alumina and zeolite P. This enables recovery of a product of higher purity and value than if the ion exchange step was not performed. The ion exchange step is conveniently conducted by contacting an aqueous solution of a suitable compound, such as an ammonium compound, for example ammonium chloride, ammonium sulphate, ammonium nitrate, ammonium hydroxide or ammonium carbonate, with the alkaline treated lithium slag residue.

Alternatively, the alkaline liquor could be used to redissolve the reactive silica from the acid extraction residue described in the next step. The re-dissolution could include only reactive silica using mild conditions, for example 90° C. and a reaction time of about an hour. This should account for about 60-80 wt % of the silica in some lithium slag qualities. The remaining silica is mainly quartz that will require higher temperatures, for example 180° C. and increased pressure for silica solubilisation. By using any suitable acid, for example sulphuric acid or $CO_2$, at a suitable temperature, e.g room temperature, the silica can be precipitated out by lowering the pH and then washed after separation.

The residue directly from alkaline treatment, or via the ion exchange step, may be subjected to an acid leaching step to form useful intermediates. Where hydrochloric acid is selected, aluminium chloride hexahydrate is leached from either the alkaline treated lithium slag or the ion exchanged residue. Aluminium trichloride hexahydrate is a useful intermediate. This step also concentrates silica in the solid phase. The silica depleted leachate is separated from the solid residue by filtration or suitable separation methods, for example pressure filtration.

As alkaline leaching of the silica rich ion exchanged solid residue may tend to result in formation of silica gel, which can hinder subsequent solid-liquid separation, the ion exchanged residue is desirably treated in a further step prior to the acid leach. Conveniently, the ion exchange residue is roasted under conditions effective to remove all moisture and part or all of the ammonia where used for ion exchange. Where a solution of an ammonium compound is used for ion exchange, as described above, the roasting step causes liberation of ammonia and moisture and a lower tendency for silica gel formation in the subsequent acid leach step. Liberated ammonia may be regenerated as ammonium chloride for use in the ion exchange step, for example by contacting it with hydrochloric acid.

The silica rich solids residue from the acid leach may then be converted to precipitated silica of >97% purity, optionally >99% purity by dissolving the residue through alkaline leaching, for example using the alkaline liquor from the regeneration step, and then treating the silicate containing leachate with a precipitant to precipitate reactive silica.

Value aluminium containing products may also be produced from the acid leachate. A first example is aluminium trichloride hexahydrate ($Al(H_2O)_6Cl_3$) which may be precipitated from the acid leachate, for example using an acid gas, such as hydrochloric acid gas. Cooling may be required to optimise the precipitation due to the exothermic nature of the reaction. Further purification steps involving re-dissolution and re-precipitation may need be conducted in some circumstances.

$Al(H_2O)_6Cl_3$ may be converted to alumina or even perhaps high purity alumina (HPA) through a further calcining step, advantageously conducted at temperatures of between about 700° C. and 1600° C.

Prior to the hydrothermal treatment step, the lithium slag may be washed with a suitable acid to remove some of the impurities, such as iron. The lithium slag may also be beneficiated through other mineral processing methods. For example, magnetic particles may be removed through any means of magnetic separation or the particle sizing may be adjusted to optimise the hydrothermal treatment step through any means such as sieving, milling or gravimetric separation. It is preferable to use a particle sizing of less than 100 microns, more preferably less than 75 microns, most preferably less than 50 microns but larger particle sizes may be selected, though expected to require longer reaction times and sufficient agitation in the hydrothermal treatment stage and possibly further treatment stages.

The process enables a current low-value by-product, lithium slag, to be used for the production of valuable aluminium and silicon containing compounds of high purity in a cost-effective manner where reagents can be regenerated and recycled and waste production minimised.

DESCRIPTION OF THE DRAWINGS

FIG. 1 is a flow diagram for extracting values from lithium slag.

DESCRIPTION OF PREFERRED EMBODIMENTS

The process for extracting values from lithium slag may be more fully understood from the following description of preferred but non-limiting embodiments made with reference to the FIGURE showing a flow diagram for the process.

Lithium slag, in the form of spodumene ore residue for example, is obtained as a waste by-product from lithium refining, for example following the spodumene leaching step which liberates substantially all lithium from the ore. The spodumene leaching step may involve sulphuric acid leaching. The lithium slag (which could for example include 68% $SiO_2$ and 26% $Al_2O_3$) is first beneficiated as follows in step 1. The particle size of the lithium is adjusted through methods such as milling and/or other classification techniques to an average particle size being less than 100 microns, desirably less than 50 microns. Magnetic particles are removed through any magnetic separation technique.

The lithium slag particles of particle size less than 50 microns (for example less than 38 microns) are then suspended, at a solids density of about 30%, in an aqueous caustic alkaline (AC) solution in an agitated tank reactor in step 2. The lithium slag to AC weight by weight ratio of the slurry is maintained in the range about 1:0.1 to about 1:2 (at 3.75M NaOH), i.e strongly alkaline, to optimise conversion of lithium slag to value silicon and alumina compounds. At lower AC ratios or alkaline concentrations, longer reaction times may be required for sufficient aluminium extraction.

The nature of the aluminium and silicon compounds obtained from the hydrothermal treatment step is dependent on the temperature and the concentration of the alkaline solution. The alkaline treated lithium slag residue contains such a compound or compounds, desirably exhibiting ion exchange properties (for example zeolites A, X or P), that are expected to be obtained in acceptable yield at temperature of about 90° C. or higher and duration of about 12 hours, though it will be understood that the duration is not critical provided that the target value compounds are obtained. The process is optimised, as described above, to a desired aluminium extraction level, for example 85% extraction or higher.

Optionally, the hydrothermal treatment is conducted in two stages and tank reactors. The first aging stage is conducted at 50° C. for about 1 hour. The second hydrothermal treatment stage is conducted, with heating to 90° C., for about 7 to 10 hours. A single hydrothermal treatment stage, at say 90-95° C. may also be used as an alternative with expected similar results in terms of product quality.

Hydrothermal treatment solubilises small amounts of alumina but silica is solubilised to greater extent as sodium silicate, given that caustic is the selected alkaline compound for hydrothermal treatment.

After the alkaline treatment of lithium slag, and solid/liquid separation step 3, the process includes an ion exchange step 4, to remove the introduced sodium or potassium or any cation already in the alkaline leached mineral matrix that may influence the quality of target value products. The ion exchange step 4 is conducted by contacting an aqueous solution of a suitable compound, such as an ammonium compound, for example ammonium chloride, ammonium sulphate, ammonium nitrate, ammonium hydroxide or ammonium carbonate, with the alkaline treated lithium slag residue at concentration of say 2M, with the alkaline treated lithium slag residue. The alkaline treated lithium slag residue is recovered from ion exchange by a solid/liquid separation stage 3 such as filtration or thickening.

Referring to ion exchange step 4 once again, the ion exchange step may have duration 30 to 60 minutes at a volume that will allow sufficient ion exchange and impurity removal. The concentration and solid density can vary. If lower concentrations are used, the ion exchange process may need to be repeated to compensate for the ion exchange equilibrium. If high concentrations are used, it is possible that the ion exchange step may be performed only once or as a single step. The ion exchange step 4 could be done at slightly higher temperatures than room temperature, for example 40 or 50° C. A process where the residue is washed with ammonium chloride in a counter current fashion may further optimise the ion exchange step 4.

The solid ion exchanged residue is heated to remove part of the ammonia as well as adsorbed water. During the heating process, the zeolite may undergo structural change likely related to ammonia release, but not necessarily solely because of it. Moreover, as residual ammonia and internal moisture in the ion exchanged residue may be associated with silica gel formation during subsequent acid leach treatment, as described below, and consequential solid liquid separation difficulties, the solid ion exchanged residue is desirably roasted to remove excess ammonia and internal moisture. Such excess ammonia may also be recycled, for example as ammonium chloride by contacting with hydrochloric acid and reused in the ion exchange step 4. The focus on recycling and minimising wastage provides cost and environmental benefits for the ion exchange step, subsequent acid leach step 8 and the overall process.

The ion exchanged residue is separated and may be heated to say 350° C. for 1 hour or the temperature could be lower, say 250° C., but perhaps for 8 hours. It appears that a hardening of the structure of the zeolite occurs with the consequence that longer roasting times will lead to a decline in alumina extraction efficiency and shorter times will lead to silica gel formation under the same acid leaching conditions.

The ion exchanged residue is then subjected to an acid leaching step 5 in which the ion exchanged residue is re-slurried in hydrochloric acid with the object of producing a useful intermediate, aluminium trichloride hexahydrate. Process conditions, for example, involve 25 wt % HCl at room temperature and reaction duration one hour at a solids density of 10% to 25% depending on how well the gel formation is controlled. Higher solid densities are achievable where the gel formation is limited. Agitated tank reactor(s) are once again employed. At higher HCl concentrations the solubility of $Al(H_2O)_6Cl_3$ is reduced. At lower HCl concentrations, extraction may also be successful, although copious quantities of HCl will be needed to saturate the $Al(H_2O)_6Cl_3$ solution to precipitate the aluminium chloride hexahydrate out. Extraction may also occur at lower temperatures, for example at room temperature.

The acid leaching step 5 only requires hydrochloric acid in slight excess to stoichiometric amounts for reaction to form $Al(H_2O)_6Cl_3$. That is, just over 3 mole equivalents of HCl for every one mole equivalent of aluminium in the residue. Acid leachate is separated from the silica rich acid leached residue by filtration or centrifugation with both solid and liquid components being subjected to further processing steps.

The silica rich acid leached residue, separated in solid/liquid separation step 6, is subjected to an alkaline leaching step 8 to solubilise the silica to a sodium silicate solution which may then be treated and purified to precipitate reactive silica. The alkaline liquor from the alkaline hydrothermal treatment stage 2 could be used to redissolve the reactive silica from the acid extraction residue. The re-dissolution could include only reactive silica using mild conditions, for example 90° C. and a reaction time of about an hour. This should account for about 60-80 wt % of the silica in some lithium slag qualities. The remaining silica is mainly quartz that will require higher temperatures, for example 180° C. and increased pressure for silica solubilisation.

The sodium silicate solution may then be acidified, and silica precipitated through known processes in the silica production step 9 using an acid, for example sulphuric acid or hydrochloric acid, or $CO_2$, at room temperature or under any other suitable conditions. The silica can then be washed and otherwise purified to the required purity, for example by adjusting the pH of the slurry to lower values to encourage the dissolution of impurities like sodium or potassium. Insolubles should be removed from the silicate solution before acidification with acids like HCl or $H_2SO_4$ for the lowering of pH until at least below 10 or even to as low as pH 2 in order to form precipitated silica.

To precipitate $Al(H_2O)_6Cl_3$ from the acid leachate from acid leaching step 5, the leachate is saturated—in precipitation stage 7—with HCl gas through known methods and the mixture kept cool to afford the best conditions for precipitation due to the exothermic nature of the reaction. The purity of the $Al(H_2O)_6Cl_3$ may be improved upon by redissolution with water or dilute HCl and re-precipitation with HCl gas until the desired purity is reached. Washing of the product with 36% HCl could be included if proven to be desirable.

The process has significant potential for increasing profitability of lithium extraction operations by enabling treatment of previously low value, lithium slag, and using it as a feedstock to produce high purity alumina, high purity silica and a range of other compounds containing aluminium, silicon or both. At the same time, commercial benefits can be achieved by recycling reagents to minimise cost and substantially eliminate waste.

Modifications and variations to the process for extracting values from lithium slag may be apparent to skilled readers of this disclosure. Such modifications and variations are deemed within the scope of the present invention.

The invention claimed is:

1. A process for obtaining high purity alumina from a waste by-product from lithium refining of lithium bearing aluminosilicate minerals, said process comprising the following steps in order:

(a) obtaining the waste by-product which has had lithium liberated therefrom;

(b) beneficiating the waste by-product of step (a) by magnetic separation for removal of magnetic impurities from the waste by-product to give a beneficiated waste by-product;

(c) hydrothermally treating the beneficiated waste by-product of step (b) with an aqueous solution of an alkaline compound at selected temperature and selected duration, whereby amounts of both alumina and silica are solubilised with a greater proportion of silica than alumina being solubilised, to give a hydrothermally treated waste by-product, cations from the alkaline compound, and an alkaline solution containing solubilised silicates;

(d) performing a solid/liquid separation step on the hydrothermally treated waste by-product of step (c) to give a solid residue;

(e) performing an ion exchange step on the solid residue of step (d) by contacting with an aqueous solution of an ion exchange compound to remove cations of the alkaline compound that were introduced during the hydrothermal treating step (c);

(f) separating the ion exchanged solid residue of step (e) from the aqueous solution of the ion exchange compound; and (g) solubilising alumina in the ion exchanged solid residue of step (f) and obtaining high purity alumina (HPA) therefrom.

2. The process of claim 1, wherein the alkaline compound is a compound selected from the group consisting of caustic soda, potassium hydroxide, sodium carbonate, and potassium carbonate.

3. The process of claim 2, wherein said solubilised silicates, which include at least one of sodium silicate and potassium silicate dependent on the alkaline compound used in step (c), are precipitated in a precipitation step; and wherein the precipitation step allows regeneration of the alkaline compound selected for the hydrothermal treatment step and the selected alkaline compound is recycled to the hydrothermal treatment step.

4. The process of claim 3, wherein the step of solubilising alumina in step (g) comprises an acid leaching step.

5. The process of claim 4, wherein the acid leaching step involves hydrochloric acid to form aluminium chloride hexahydrate in an acid leachate and an acid leached residue.

6. The process of claim 4, wherein the ion exchange step (e) is conducted by contacting an aqueous solution of an ammonium compound with the solid residue.

7. The process of claim 6, wherein said ammonium compound is selected from the group consisting of ammonium hydroxide and ammonium carbonate.

8. The process of claim 4, wherein the ion exchange step (e) is conducted by contacting an aqueous solution of an ammonium compound with the solid residue; and wherein said ion exchanged solid is roasted under conditions effective to remove all moisture and at least part of the ammonia formed during ion exchange.

9. The process of claim 4, wherein said acid leaching step forms an acid leached residue depleted of alumina and containing reactive silica and said reactive silica in the acid leached residue is redissolved by alkaline leaching to form a silica containing solution.

10. The process of claim 9, wherein the reactive silica is precipitated from the silica containing solution from which insolubles have been removed by lowering the pH of the silica containing solution.

11. The process of claim 4, wherein aluminium trichloride hexahydrate is precipitated from the acid leachate using a gaseous precipitant.

12. The process of claim 11, wherein said aluminium trichloride hexahydrate is converted into high purity alumina through a calcining step at temperatures of between about 700° C. and 1600° C.

13. The process of claim 11, wherein said gaseous precipitant is hydrochloric acid gas.

14. The process of claim 3, wherein the waste by-product is obtained by liberating lithium from spodumene by sulphuric acid leaching.

15. The process of claim 1, wherein in step (c) the waste by-product to alkaline compound weight by weight ratio is in the range of about 1:0.1 to about 1:2.

16. The process of claim 15, wherein said selected temperature is higher than 60° C.

17. The process of claim 16, wherein, in the hydrothermally treated waste by-product, the density of aluminosilicates in the alkaline solution is up to about 50 wt %.

18. The process of claim 16, wherein said selected temperature is higher than 90° C.

19. The process of claim 1, wherein step (b) further comprises at least one process selected from the group consisting of washing the waste by-product with acid to remove impurities and particle sizing adjustment to optimise the hydrothermal treatment of step (c).

20. The process of claim 19, wherein particle sizing is adjusted to less than 100 microns.

21. The process of claim 20, wherein particle sizing is adjusted to less than 50 microns.

* * * * *